March 30, 1965  J. M. MACY  3,175,409
VARIABLE SPEED DRIVE MECHANISM
Filed Feb. 26, 1962  9 Sheets-Sheet 1
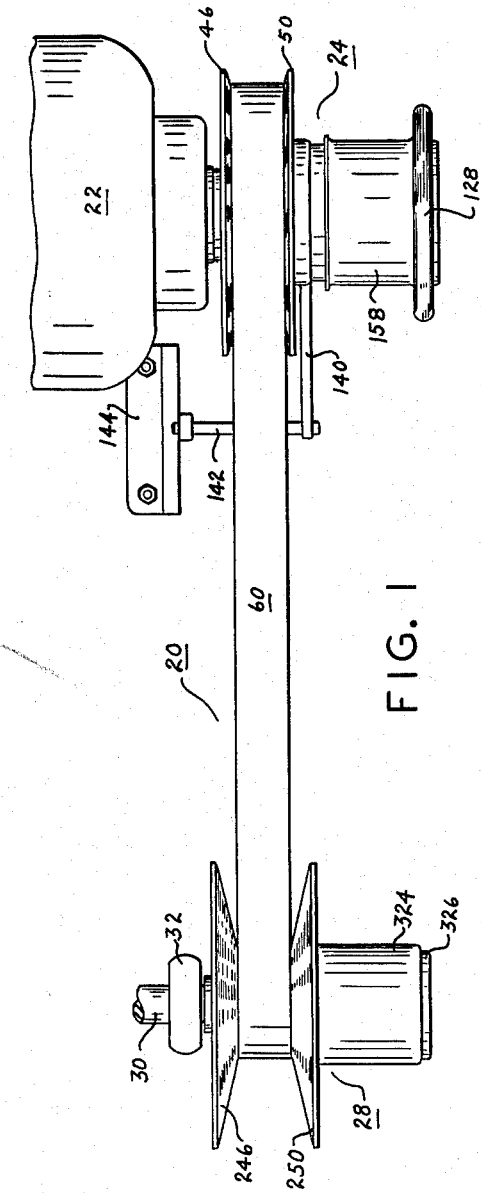
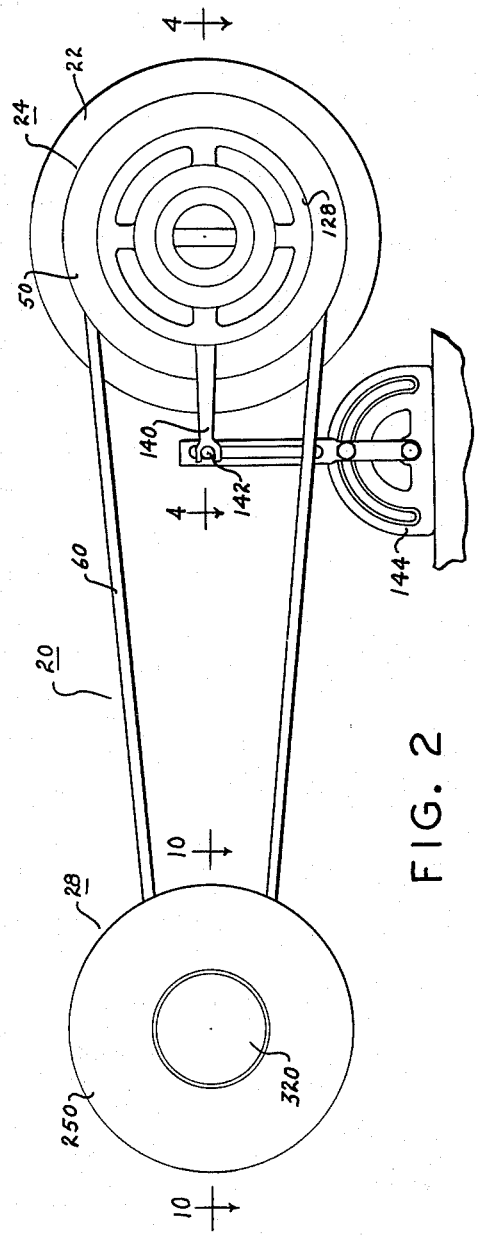
INVENTOR.
JOHN M. MACY
BY Hobbs & Caston
ATTORNEYS

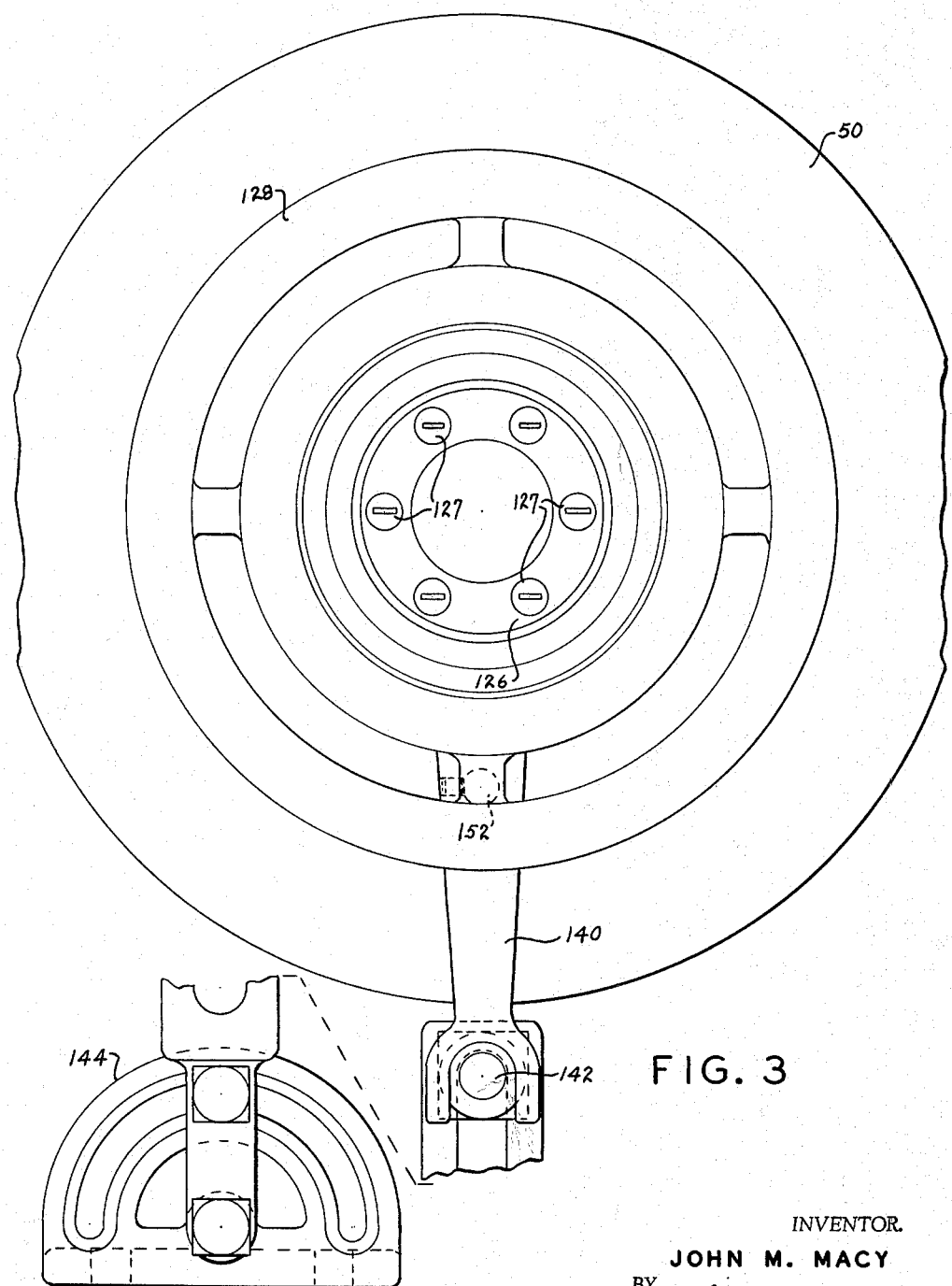

INVENTOR.
JOHN M. MACY

March 30, 1965 J. M. MACY 3,175,409
VARIABLE SPEED DRIVE MECHANISM
Filed Feb. 26, 1962 9 Sheets-Sheet 4

INVENTOR.
JOHN M. MACY
BY Hobbs & Caston
ATTORNEYS

March 30, 1965 J. M. MACY 3,175,409
VARIABLE SPEED DRIVE MECHANISM
Filed Feb. 26, 1962 9 Sheets-Sheet 5

INVENTOR.
JOHN M. MACY
BY *Hobbs & Caxton*
ATTORNEYS

March 30, 1965 J. M. MACY 3,175,409
VARIABLE SPEED DRIVE MECHANISM
Filed Feb. 26, 1962 9 Sheets-Sheet 7

INVENTOR.
JOHN M. MACY
BY Hobbs & Easton
ATTORNEYS

March 30, 1965  J. M. MACY  3,175,409
VARIABLE SPEED DRIVE MECHANISM
Filed Feb. 26, 1962  9 Sheets-Sheet 8
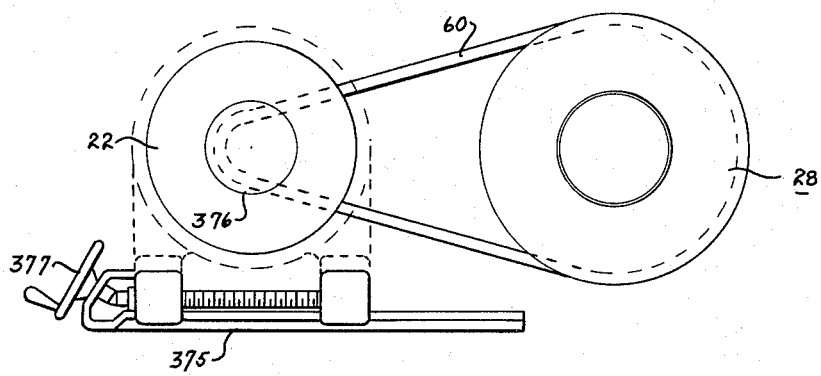
FIG. 13
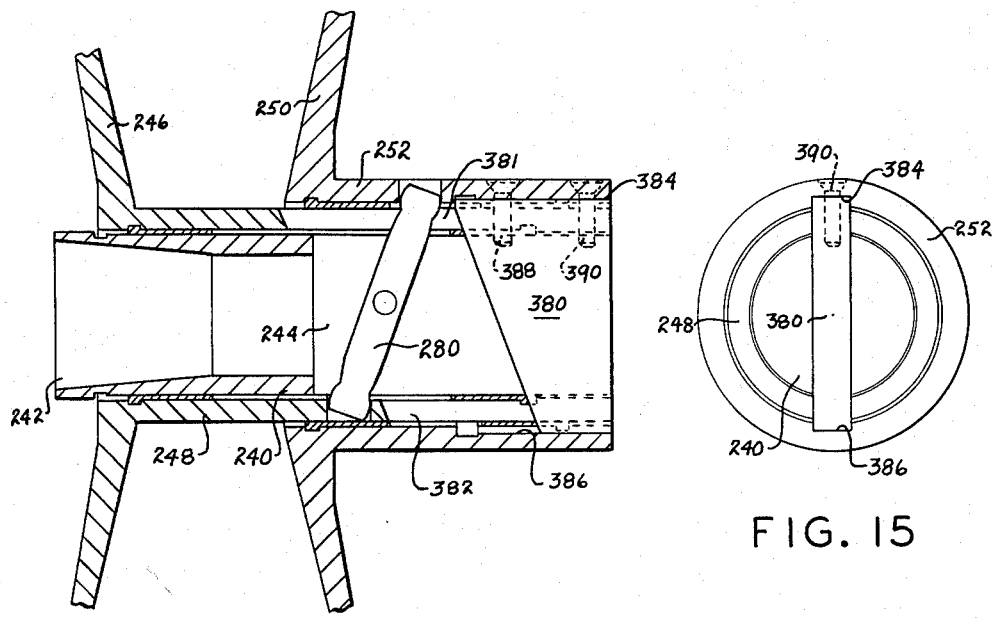
FIG. 14
FIG. 15
INVENTOR.
JOHN M. MACY
BY Hobbs & Easton
ATTORNEYS

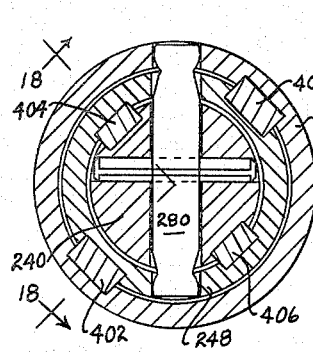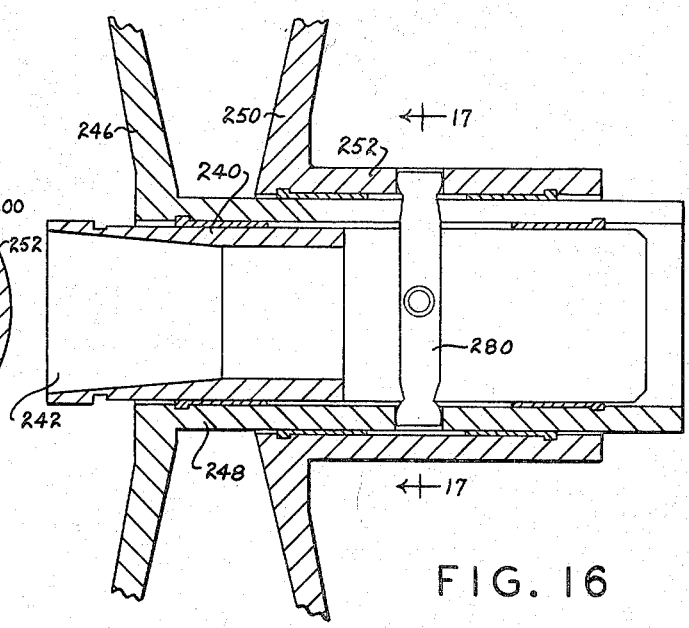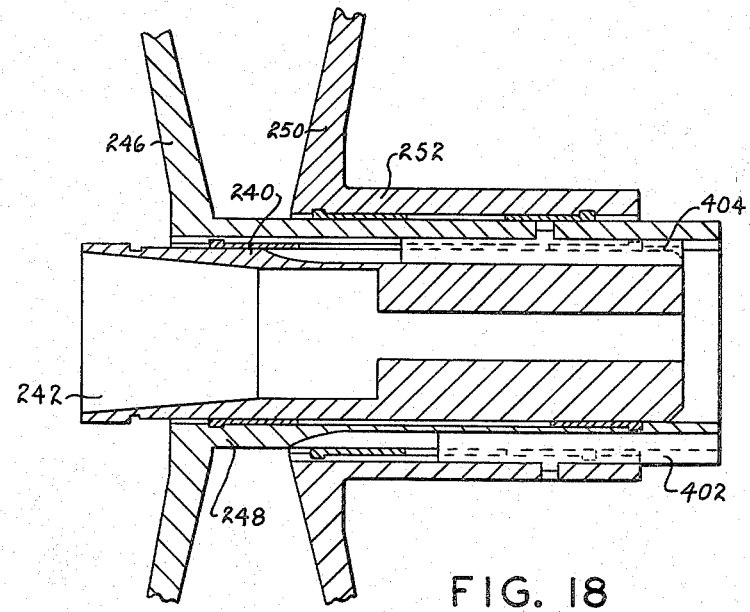

United States Patent Office 3,175,409
Patented Mar. 30, 1965

3,175,409
VARIABLE SPEED DRIVE MECHANISM
John M. Macy, South Bend, Ind., assignor to Dodge Manufacturing Corporation, Mishawaka, Ind., a corporation of Indiana
Filed Feb. 26, 1962, Ser. No. 175,673
8 Claims. (Cl. 74—230.17)

The present invention relates to a variable speed drive mechanism and more particularly to variable pitch sheaves adapted to be used as individual sheaves or in combination with one another.

In the power transmission field, variable V-belt sheaves are extensively used, often in combination with one another in which one of the variable sheaves is adjusted by the operator and the other sheave automatically adjusts itself to accommodate the adjustments made on the first mentioned sheave, or in combination with a non-variable sheave in which one of the sheaves is moved relative to the other to compensate for variations in effective belt length when adjustments in speed are made. These variable speed drives often operate for extended periods of time under heavy loads and are consequently subject to accelerated and excessive wear, particularly in the slidable sheave parts involved in the adjustments for different speeds. As a result of these prolonged adverse operating conditions, a substantial amount of fretting occurs in the parts subjected to the relative sliding contact, ultimately interfering with the proper operation and adjustment of the sheaves and necessitating the eventual replacement of individual parts or of the complete sheaves. Further, in conventional installations of variable speed drives of the aforementioned type, the mechanism, including the movable flanges, often interferes with mounting or installing the sheave in juxtaposition to the drive or driven shaft bearings or housings therefore, and consequently the bearings and shafts are subjected to excess wear when the sheaves are placed under excessive load during normal operation of the drives. It is therefore one of the principal objects of the invention to provide a variable speed drive having adjustable pitch sheaves with axially slidable parts, which can effectively and readily be adjusted to obtain the desired operating speed, and which is so constructed and arranged that the slidable parts will withstand long continued operation under heavy loads without the opposed sliding surfaces becoming scored, corroded, or otherwise being damaged or subjected to excessive wear.

Another object of the invention is to provide a variable pitch sheave which will operate over extended periods of time with numerous adjustments in speed being made, without fretting occurring on the relatively slidable surfaces of the parts involved in making adjustments of the sheave pitch.

Still another object of the invention is to provide a compact, sturdy and versatile variable pitch sheave which can readily be mounted on and effectively secured to the drive or driven shaft in close proximity to the bearings or bearing housings of the shafts, thereby minimizing the stresses on the bearings and shafts throughout the operation of the drive, particularly while the drive is operating under heavy loads.

A further object is to provide a variable speed drive having one or more adjustable pitch sheaves, which can be easily fabricated, assembled and installed using only standard equipment and tools, and which can thereafter be readily serviced and repaired in the field using easily installed and assembled parts and subassemblies.

Another object of the invention is to provide a variable pitch sheave of the aforesaid type, the parts of which are so constructed and arranged that they will withstand long continued operation without service and without developing any adverse conditions, such as vibration or hunting, interfering with optimum operation of the drive in which the sheaves are used.

Additional objects and advantages of the present invention will become apparent from the following description and accompanynig drawings, wherein:

FIGURE 1 is a plan view of a variable speed drive embodying the present invention, showing an electric motor as the source of power transmitted by the present drive;

FIGURE 2 is a side elevational view of the variable speed drive shown in FIGURE 1;

FIGURE 3 is an enlarged side elevational view of one of the variable pitch sheaves forming a part of the drive illustrated in FIGURES 1 and 2;

FIGURE 13 is a side elevational view of a variable speed drive, illustrating the use of the variable pitch sheave of FIGURE 10 in combination with a fixed pitch sheave;

FIGURE 14 is a fragmentary cross sectional view of a modified form of the present invention, the section being taken on the same lines as FIGURES 4 and 10;

FIGURES 15 is an end view of the sheave shown in FIGURE 14;

FIGURE 16 is a fragmentary cross sectional view of a further modified form of the present sheaves, the section being taken on the same lines as FIGURES 4 and 10;

FIGURE 17 is a cross sectional view of the sheave shown in FIGURE 16 taken on line 17—17; and FIGURE 18 is a fragmentary cross sectional view of the sheave shown in FIGURES 16 and 17, the section being taken on line 18—18 of FIGURE 17.

Figure 7:
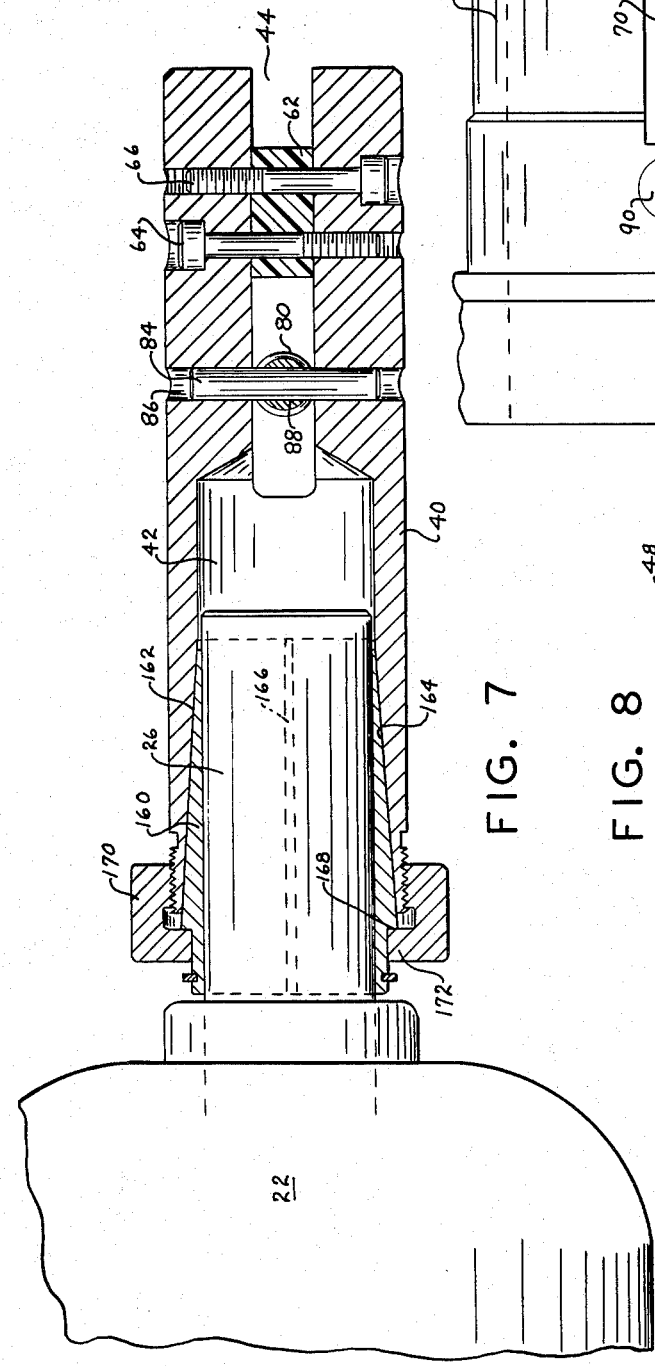
FIGURE 7 is an enlarged cross sectional view of the hub of the sheave shown in FIGURE 4, the section being taken on line 7—7 of the latter figure.
Figure 9:
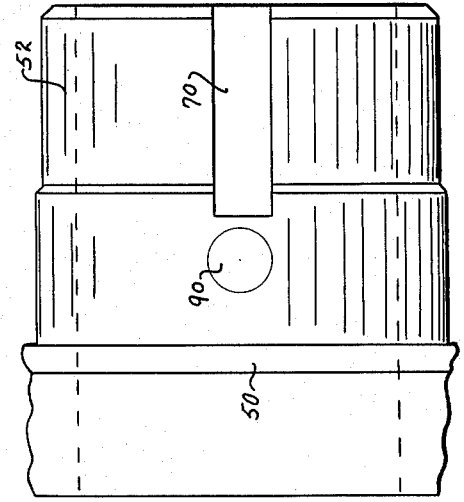
FIGURE 9 is a plan view of the sleeve of the outer flange of the sheave shown in FIGURE 4.
Figure 8:
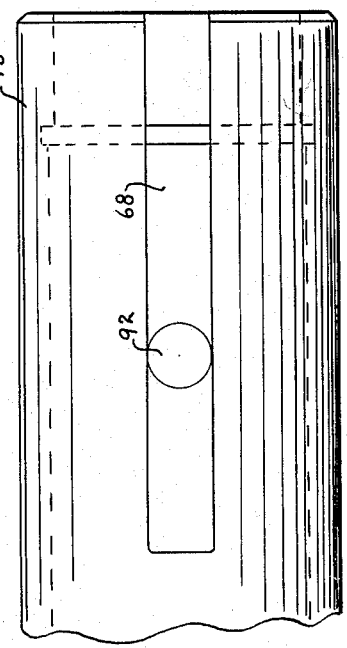
FIGURE 8 is a plan view of the sleeve of the inner flange of the sheave shown in FIGURE 4.

Referring more specifically to the drawings and to FIGURES 1, 2 and 7 in particular, the present variable speed drive 20 is shown connected to an electric motor 22 as the source of power, the drive consisting basically of variable pitch sheave 24 mounted on and secured to the shaft 26 of motor 22, and variable pitch sheave 28 mounted on and secured to the end of driven shaft 30 journalled in the bearing 32. In the drive, sheave 24 is manually adjustable for varying the speed of the drive over a wide range, and sheave 28 is automatically adjustable to adapt itself to variations in the adjustments made on manually adjusted sheave 24. While the present variable speed drive is shown connecting the shaft of a motor to a driven shaft with the manually adjusted sheave mounted on the drive shaft, the drive can be mounted on any conventional drive and driven shafts of parallel arrangement with power being supplied from any other suitable source. The manually adjustable sheave 24 and automatically adjustable sheave 28 may be reversed with respect to the drive and driven shafts, the arrangement shown in the drawings being only for the purpose of illustrating the construction and operation of the present drive.

Figure 4:
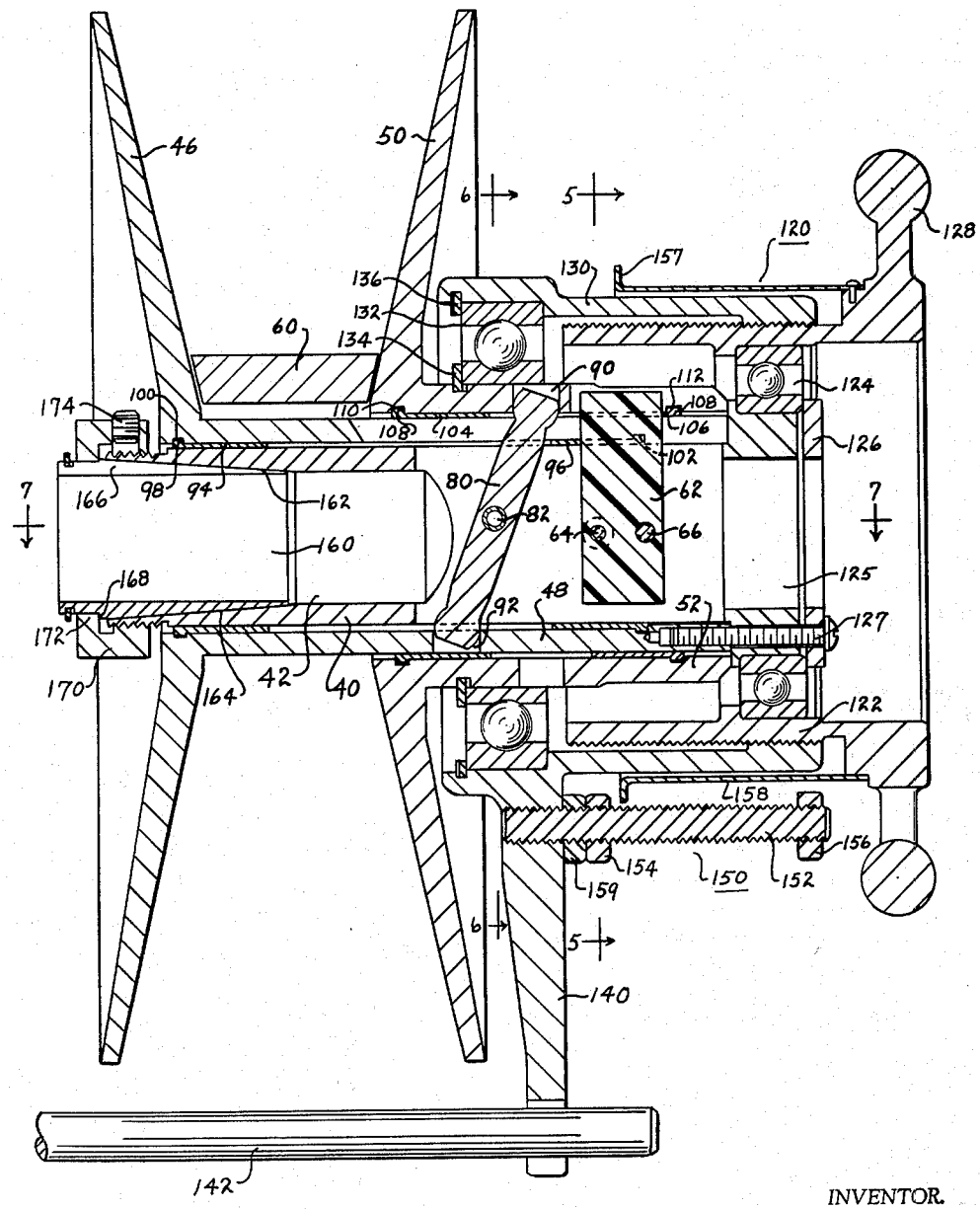
FIGURE 4 is an enlarged cross sectional view of one of the variable pitch sheaves shown in FIGURES 1 and 2, the section being taken on line 4—4 of FIGURE 2.
Figure 5:
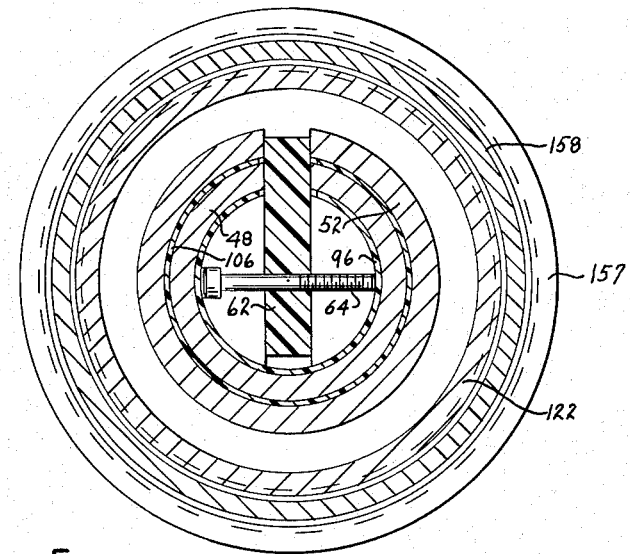
FIGURE 5 is a vertical cross sectional view of the variable pitch sheave shown in FIGURE 4, taken on line 5—5 of the latter figure.
Figure 6:
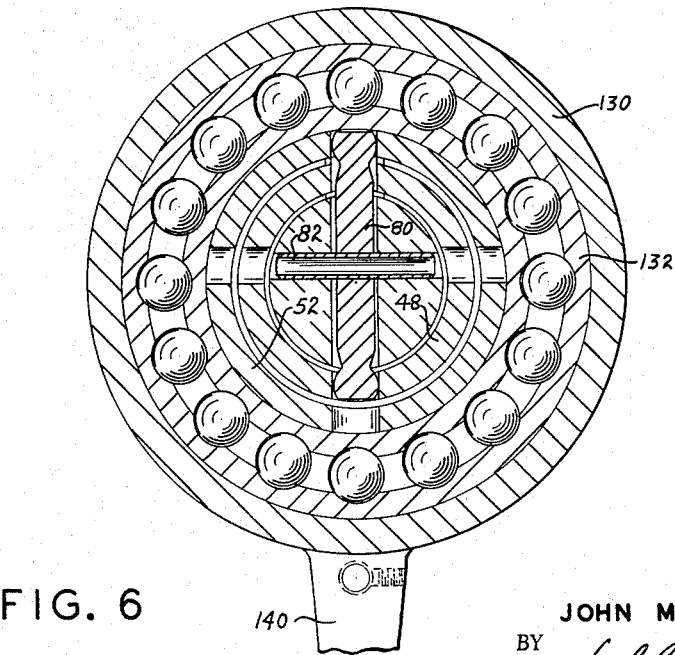
FIGURE 6 is a vertical cross sectional view of the sheave shown in FIGURE 4, taken on line 6—6 of FIGURE 4.

The construction of manually adjustable sheave 24 is best illustrated in FIGURES 4 and 7, and consists of a sleeve hub 40 having a longitudinal bore 42 extending inwardly from the left-hand end, as viewed in the figures, for receiving the end of a drive or driven shaft, and a transverse slot 44 extending inwardly from the right-hand end thereof for receiving parts of the adjustment mechanism for varying the pitch of the sheave. Mounted on sleeve hub 40 is an inner flange 46 having a sleeve 48 secured rigidly thereto and extending longitudinally and concentric with hub 40 on which it is adapted to slide when adjustments in the pitch of the sheave are made, and mounted on sleeve 48 and concentric therewith is an outer flange 50 having a sleeve 52 secured rigidly thereto and slidable longitudinally on sleeve 48 when the adjustments are made. The inner and outer flanges consist primarily of frusto-conically shaped discs extending outwardly from the sleeves and forming contact surfaces for V-belt 60. Hub 40, inner and outer flanges 46 and 50, and sleeves 48 and 52 are driven in unison from the drive shaft 26, and are locked against relative rotation by a drive key 62, seated in slot 44 and secured therein by screws 64 and 66 extending transversely through hub 40 and threadedly received therein after the key has been properly located in the slot. The drive key extends laterally from one side of hub 40 into longitudinal slots 68 and 70 of sleeves 48 and 52, respectively, and thereby keys or locks the two sleeves with hub 40 for rotation therewith, the slots being arranged with respect to the key to permit longitudinal movement of the two sleeves axially on hub 40 and relative to one another for making adjustments in the pitch of the sheave, as will be more fully described hereinafter.

In order to maintain the center of the belt in a predetermined fixed position when adjustments in the pitch of the sheave are made, sleeves 48 and 52, respectively, are interconnected by an equalizer bar 80 contacting the sleeves at its ends and on opposite sides of pivot means 82, the pivot means consisting of a pin 84 extending through a bore 86 in hub 40 and through a centrally located hole 88 in bar 80. The upper end of bar 80, as viewed in FIGURE 4, seats in a hole 90 in sleeve 52 for operative engagement with the sleeve, and the lower end of the bar seats in hole 92 in sleeve 48 for engagement with this sleeve. The ends of bar 80 are curved to form effective bearing surfaces for engaging the respective sleeve within holes 90 and 92 and for providing a constant uniform contact surface between the bar and the sleeves. It is seen that movement of outer flange 50 and sleeve 52 longitudinally, for example from right to left as viewed in FIGURE 4, results in a corresponding longitudinal movement of flange 46 and sleeve 48 from left to right so that the two flanges 46 and 50 constantly remain an equal distance from the original center line of belt 60.

In the variable pitch sheaves of the present type, substantial difficulty has been encountered in fretting and corrosion of the adjacent sliding surfaces between the hub and the sleeves of the inner and outer flanges. These adverse conditions often develop rapidly during the operation of the sheave and seriously interfere with the operation of the drive, rendering further adjustments of the sheave difficult, and creating vibration in the drive, occasionally to the extent that the complete sheave or the principal components thereof must be replaced. Conventional lubrication between the various parts has been found inadequate and unsatisfactory in preventing or eliminating the conditions creating fretting, corrosion and ultimately vibration in the drive. In the present drive mechanism, this difficulty has been eliminated or minimized by inserting between hub 40 and the internal surface of sleeve 48 a pair of bushings 94 and 96, preferably of acetal resin, referred to in the trade as "Delrin." The two bushings are split rings with an external rib 98 seating in retaining grooves 100 and 102 in the surface of the bore through sleeve 48. The two sleeves are assembled in the bushings by pressing the ends of the bushings toward one another to reduce the diameter, and then slipping the bushings in the bore and releasing them so that external rib 98 will seat in the retaining groove. Similar bushings 104 and 106 are interposed between the external surface of sleeve 48 and the internal surface of sleeve 52, the external rib 108 of each bushing seating in annular retaining grooves 110 or 112 in the wall of the bore of sleeve 52. Inasmuch as the material used in the construction of bushings 94, 96, 104 and 106 has lubricating properties as well as good bearing characteristics, fretting and corrosion, normally created by the direct contact of ineffectively lubricated metal surfaces, are eliminated or minimized, thus materially increasing the life of optimum performance of the sheave over extended periods of time.

Control of the variations in pitch of the sheave is obtained by adjustment mechanism 120, consisting of an externally threaded cylinder 122 surrounding the right-hand end of hub 40 and sleeves 48 and 52, the cylinder being mounted on the sheave for relative rotation with the hub and sleeves by ball bearing 124 secured to the internal surface of cylinder 122 and to retainer rings 125 and 126 which in turn are joined to the end of inner sleeve 48 by a plurality of screws 127 extending through the rings into sleeve 48. Rotation of cylinder 122 on the hub is controlled by a motion control wheel 128 joined integrally at its internal edge to cylinder 122. An external cylinder 130 threadedly engages the external surface of cylinder 122 at one end and is rotatably joined at the other end to sleeve 52 for axial movement therewith, by a ball bearing 132 joined to the external surface of sleeve 52 and to the internal surface of cylinder 130. The bearing is held in place by snap rings 134 and 136, seating in grooves in the sleeve and cylinder, respectively. Rotation of cylinder 130 with hub 40 and sleeves 48 and 52, is prevented by a motion control arm 140 held rigidly by rod 142 of an adjustable base or anchor means 144 mounted on the motor base or any other rigid support, as illustrated in FIGURES 1 and 2. Motion control arm 140 moves laterally along rod 142 as cylinder 130 slides sleeve 52 longitudinally on sleeve 48. The movement of flanges 46 and 50 toward and away from one another is accomplished by rotating motion control wheel 128 and cylinder 122, causing the two cylinders 122 and 130 and sleeves 48 and 52 to move axially in opposite directions on hub 40. The equalizer bar functions during this movement to maintain the flanges equally spaced on either side of the original center line of the belt. Thus, it is seen that rotation of motion control wheel 128 in one direction results in movement of flanges 46 and 50 toward one another and movement of the wheel in the opposite direction results in movement of the flanges away from one another. As the two flanges are moved inwardly toward one another, belt 60 is urged outwardly along the inner surfaces of the flanges, and as the two flanges are moved away from one another, the belt moves inwardly toward the position shown in the drawings. An abutment or stop 150 is provided for limiting the range of adjustments on the sheave, the stop consisting of a threaded shaft or stud 152 secured to arm 140, and having stop nuts 154 and 156 for limiting the inward and outward relative movement of cylinders 122 and 130, the nuts being contacted at the limits of movement by an annular flange 157 around the inner end of a cover 158 which is secured to and moves with wheel 128. A lock nut 159 secures stud 152 in place after it has been assembled on arm 140.

One of the important features of the present variable pitch sheaves is the means by which they are secured to the respective shafts, permitting the hub of the sheaves to be assembled and secured in place in close proximity to the bearing or shaft support. This close proximity position is best seen in FIGURES 1 and 7 in which the hub is shown with only a relatively small spacing between the end of the hub assembly and the housing of motor 22. The securing and disassembling means consists of a split bushing 160 having an external tapered surface 162 for engaging a corresponding tapered surface 164 in bore 42 of hub 40, the split in the bushing consisting of a longitudinal slot 166 extending throughout the length thereof. A shoulder 168 is provided on the external surface of the bushing near the left-hand end thereof, as viewed in FIGURES 4 and 7, and a threaded portion is provided on the adjacent end of hub 40. A collar 170, having an internally extending flange 172, is threaded onto the end of hub 40 in engagement with shoulder 168, for forcing the bushing 160 inwardly against tapered surface 164 as the collar is tightened, thereby contacting bushing 160 firmly onto drive shaft 26. After the collar has been tightened to the extent necessary to secure the sheave on the shaft, a set screw 174 is tightened to lock it in place. Keys and key-ways are preferably provided between the bushing and shaft.

Figure 10:
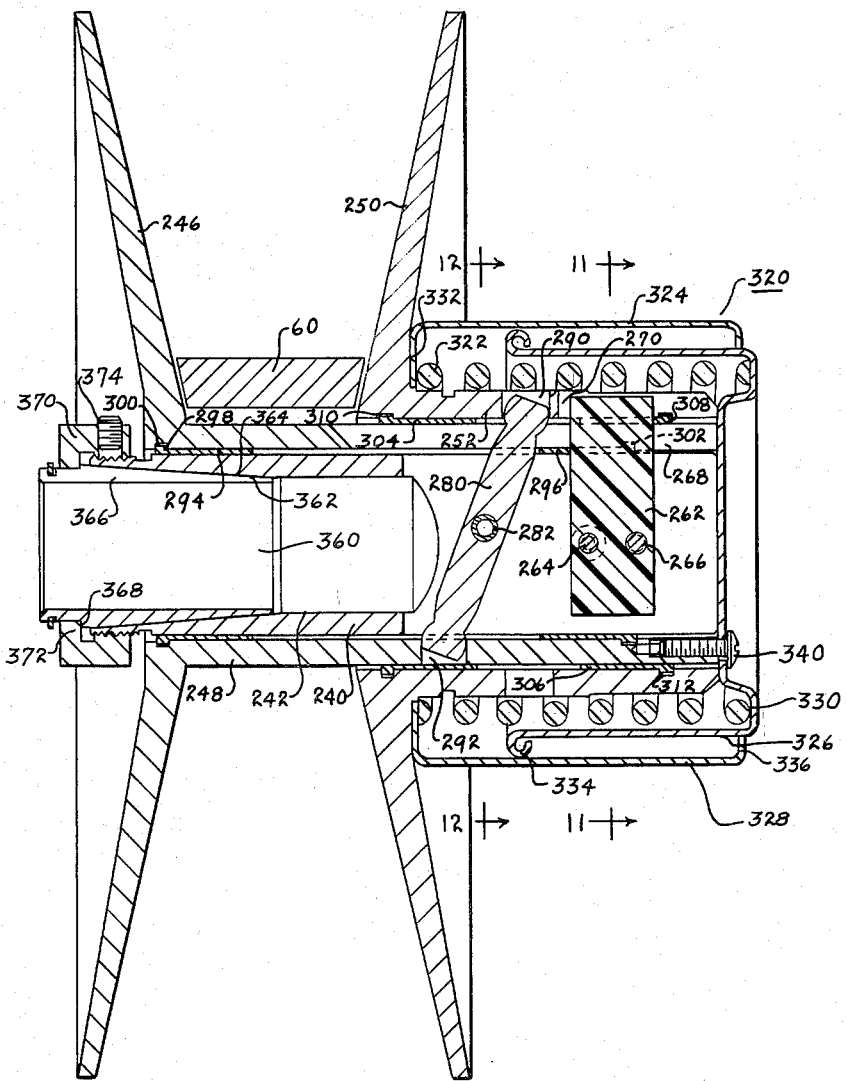
FIGURE 10 is a cross sectional view of the other variable pitch sheave shown in FIGURES 1 and 2, the section being taken on line 10—10 of FIGURE 2.
Figure 11:
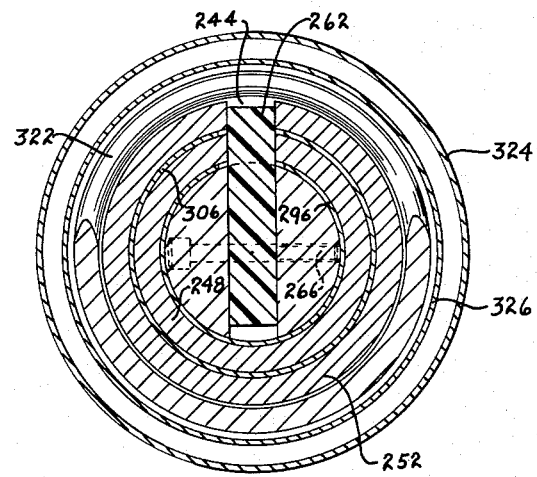
FIGURE 11 is a vertical cross sectional view of the sheave shown in FIGURE 10, taken on line 11—11 of the latter figure.
Figure 12:
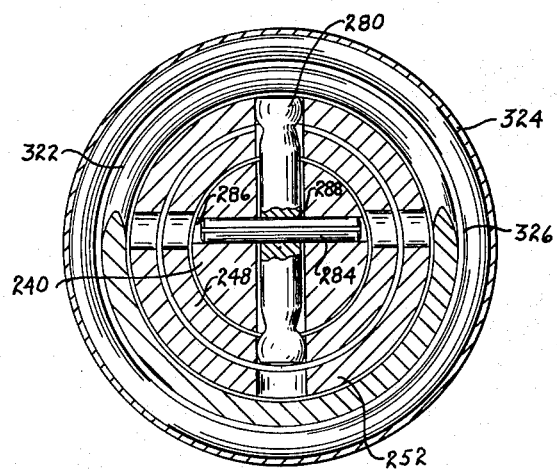
FIGURE 12 is a vertical cross sectional view of the sheave shown in FIGURE 10, taken on line 12—12 of the latter figure.

The construction of automatically or self adjustable sheave 28 is shown in detail in FIGURES 10, 11 and 12 and is similar in many respects to the manually adjustable sheave 24 and consists of a sleeve hub 240 having a longitudinal bore 242 extending inwardly from the left-hand end, as viewed in FIGURE 10, for receiving the end of a shaft, and a transverse slot 244 extending inwardly from the right-hand end thereof for receiving parts of the adjustment mechanism for varying the pitch of the sheave. Mounted on sleeve hub 240 is an inner flange 246 having a sleeve 248 secured rigidly thereto and extending longitudinally and concentric with hub 240 on which it is adapted to slide when adjustments in the pitch of the sheave are made, and mounted on sleeve 248 and concentric therewith is an outer flange 250 having a sleeve 252 secured rigidly thereto and slidable longitudinally on sleeve 248 when the adjustments are made. Hub 240, inner and outer flanges 246 and 250, and sleeves 248 and 252 are driven in unison from the drive shaft 26, and are locked against relative rotation by a drive key 262, seated in slot 244 and secured therein by screws 264 and 266 extending transversely through hub 240 and threadedly received therein after the key has been properly located in the slot. The drive key extends laterally from hub 240 into longitudinal slots 268 and 270 of sleeves 248 and 252, respectively, and thereby keys or locks the two sleeves with hub 240 for rotation therewith, the slots being arranged with respect to the key to permit longitudinal movement of the two sleeves axially on hub 240 and relative to one another for making adjustments in the pitch of the sheave.

In order to maintain the center of belt 60 in a predetermined fixed position when adjustments in the pitch of the sheave are made, sleeves 248 and 252, respectively, are interconnected by an equalizer bar 280 contacting the sleeves at its ends and on opposite sides of pivot means 282, the pivot means consisting of a pin 284 extending through a bore 286 in hub 240 and through a centrally located hole 288 in bar 280. The upper end of bar 280, as viewed in FIGURE 10, seats in a hole 290 in sleeve 252 for operative engagement with the sleeve, and the lower end of the bar seats in hole 292 in sleeve 248 for engagement with this sleeve. The ends of bar 280 are curved to form effective bearing surfaces for engaging the respective sleeve within holes 290 and 292 and for providing a constant contact surface between the bar and the sleeves. It is seen that movement of outer flange 250 and sleeve 252 longitudinally, for example from right to left as viewed in FIGURE 10, results in a corresponding longitudinal movement of flange 246 and sleeve 248 from left to right so that the two flanges 246 and 250 constantly remain an equal distance from the original center line of belt 60.

In sheave 28 as in sheave 24, fretting and corrosion of the sliding parts are eliminated or minimized by inserting between hub 240 and the internal surface of sleeve 248 a pair of bushings 294 and 296, preferably of acetal resin. The two bushings are split rings with an external rib 298 seating in retaining grooves 300 and 302 in the surface of the bore through sleeve 248. Similar bushings 304 and 306 are interposed between the external surface of sleeve 248 and the internal surface of sleeve 252, the external rib 308 of each bushing seating in annular retaining grooves 310 and 312 in the wall of the bore of sleeve 252.

Sheave 28 is adjusted automatically by the pressure of belt 60 on flanges 246 and 250, urging sleeves 248 and 252 to the left and right, respectively, as viewed in FIGURE 10. The movement of the two flanges away from one another is resisted by adjustment mechanism 320, consisting of a coil spring 322 enclosed in a telescopic shell 324 of an inner cup-shaped member 326 and an outer cylinder 328 overlapping cup-shaped member 326. Spring 322 is in effect "captured" within telescopic shell 324 with one end of the spring seating against bottom 330 of cup-shaped member 326, and the other end of the spring seating against an internally extending flange 332 on the inner edge of cylinder 328. On the inner end of cup-shaped member 326 is a bead 334 forming an externally extending flange, and on the outer end of cylinder 328 is an internally extending flange 336, flanges 334 and 336 interlocking to prevent displacement of member 326 and cylinder 328 from one another and to hold spring 322 in compression within telescopic shell 320. Cup-shaped member 326 is rigidly secured to the end of sleeve 248 by a plurality of screws 340 extending through bottom 330 into the end of the sleeve. Flange 332 of cylinder 328 seats against the external surface of sheave flange 250 and urges the flange and sleeve 252 to the left, as viewed in FIGURE 10.

An increasing pressure applied by belt 60 on flanges 246 and 250 urges sleeve 248 to the left and sleeve 252 to the right in opposition to the force of spring 322 until an equilibrium is set up between the force applied by the belt and the force applied by the spring. The flanges then remain in the newly assumed position until a further adjustment has been made on sheave 24. The equalizer bar 280 maintains the two flanges 246 and 250 equally spaced on either side of the original center line of belt 60, regardless of the pitch setting on the sheave.

The same type of means is used to secure and disassemble sheave 28 to the shaft as used in sheave 24, consisting of a split bushing 360 having an external tapered surface 362 for engaging a corresponding tapered surface 364 in bore 242 of hub 240, the split in the bushing consisting of a longitudinal slot 366 extending throughout the length thereof. Key and key-ways are preferably provided between the bushing and shaft. A shoulder 368 is provided on the external surface of the bushing near the left-hand end thereof, as viewed in FIGURE 10, and a threaded portion is provided on the adjacent end of hub 240. A threaded ring 370, having an internally extending flange 372, is threaded onto the end of hub 240 in engagement with shoulder 368, thereby forcing the bushing 360 inwardly against tapered surface 364 as ring 370 is tightened, and consequently contracting bushing 360 firmly onto drive shaft 26. After ring 370 has been tightened to the extent necessary to secure the sheave on the shaft, a set screw 374 is tightened to lock the ring in place.

In the operation of the present variable speed drive, after sheaves 24 and 28 have been mounted on the drive and driven shafts, respectively, the operator may make adjustments in the speed of the drive by rotating motion control wheel 128 in the direction to increase or decrease the pitch on sheave 24. For example, if the wheel is rotated in the direction to move flanges 46 and 50 apart, the belt will move from a position adjacent the periphery toward the position shown in FIGURE 4. The movement of the belt in this direction temporarily decreases the force of the belt on flanges 246 and 250 of sheave 28, permitting spring 322 to urge flanges 246 and 250 toward one another, and thereby urging belt 60 outwardly along the inner surfaces of the two flanges toward the periphery thereof. When wheel 128 is rotated in the direction to move flanges 46 and 50 toward one another, belt 60 moves outwardly on the two flanges, thereby increasing the pressure of the belt on flanges 246 and 250 and urging the two flanges outwardly to permit the belt to move inwardly toward the hub in opposition to the force of spring 322, until an equilibrium is established between the force of belt 60 on the two flanges, and the force of spring 322 urging the two flanges together.

As previously mentioned, sheave 28 may be used in combination with a fixed pitch sheave and one such combination is illustrated in FIGURE 13. In this arrangement, sheave 28 is mounted on a shaft on a stationary bearing support and the fixed pitch sheave is shifted toward and away from sheave 28 causing the belt to apply a greater or lesser pressure on flanges 246 and 250, and thereby varying the pitch of the sheave and consequently the speed of the drive. In FIGURE 13, sheave 28 is mounted on a fixed rotatable shaft and is driven by motor 22 mounted on an adjustable motor mount 375, shown schematically. The motor and fixed pitch sheave 376 are moved toward and away from sheave 28 by rotation wheel and screw 377. It is apparent that the same type of speed adjustment can be made by mounting sheave 28 on a shaft adapted to move toward and away from the fixed pitch sheave while retaining the latter sheave in fixed position.

In the modified form of the present sheave shown in FIGURES 14 and 15, the basic construction is the same as those previously described and the same numerals as those used in describing the parts of the sheave of FIGURE 10 where applicable will be ued here, and the construction and operation of those parts will be only briefly mentioned. The modified construction can be used equally as well in either the manually adjustable form of FIGURE 4 or the automatically adjustable form of FIGURE 10. The modified form consists of a hub 240 having a longitudinal bore 242 extending inwardly from the left-hand end for receiving the end of a shaft, and a transverse slot 244 extending inwardly from the right-hand end thereof for receiving parts of the adjustment mechanism for varying the pitch of the sheave. Mounted on hub 240 is an inner flange 246 having a sleeve 248 secured rigidly thereto and extending longitudinally and concentric with hub 240 on which it is adapted to slide when adjustments in the pitch of the sheave are made, and mounted on sleeve 248 and concentric therewith is an outer flange 250 having a sleeve 252 secured rigidly thereto and slidable longitudinally on sleeve 248 likewise when the adjustments are made. In this modified form, hub 240, inner and outer flanges 246 and 250, and sleeves 248 and 252 are locked against relative rotation by a drive key 380 extending transversely through slot 244 and slots 381 and 382 in sleeve 248, and into diametrically opposed longitudinal grooves 384 and 386 in the inner surface of sleeve 252, where it is rigidly secured by screws 388 and 390. The key, which is preferably of acetal resin such as Delrin, moves in unison with sleeve 252 and slides freely in slots 244, 381 and 382. The drive key locks the two sleeves with hub 240 for rotation therewith and is arranged with respect to the position of the slots to permit longitudinal movement of the two sleeves axially on hub 240 and relative to one another for making adjustments in the pitch of the sheave. As in the previous embodiments, the center of belt 60 is maintained in a predetermined fixed position when adjustments in the pitch of the sheave are made by the pivoted equalizer bar 280 contacting the sleeves and moving the two flanges equally in opposite directions, while drive key 380 effectively transmits the torque between the sleeves and the hub without interfering with the relative axial movement of these three parts.

The modified form shown in FIGURES 16, 17 and 18 is basically the same as the previously described embodiments, the modification contained therein being applicable to the forms shown in both FIGURE 4 and/or FIGURE 10. In this further modified form, keys 400 and 402 are inserted in opposed grooves in the internal surface of sleeve 252 and in the external surface of sleeve 248, and keys 404 and 406 are inserted in the respective grooves in the internal surface of sleeve 248, and in the external surface of hub 240. Keys 400 and 402 permit longitudinal sliding movement between sleeves 248 and 252 while preventing relative rotation therebetween. Keys 404 and 406 permit sliding movement between sleeve 248 and hub 240 while preventing relative rotation therebetween. These four drive keys perform the same function as drive keys 62, 262, and 380 of FIGURES 4, 10 and 14, and effectively transmit the torque between the sleeves and the hub and prevent these parts from rotating relative to one anoher and from engaging and interfering with the movement of equalizing bar 280 while an adjustment of the two flanges 246 and 250 is taking place. The construction and operation of this modification are otherwise the same as those disclosed hereinbefore and will not be described in further detail here.

While several embodiments of the present sheaves have been described in detail herein, various other changes and modifications may be made to satisfy requirements without departing from the scope of the invention.

I claim:

1. A variable pitch sheave, comprising inner and outer flanges movable axially relative to one another, said inner flange having a sleeve secured thereto and extending laterally therefrom, said outer flange having a sleeve secured thereto and mounted on said first mentioned sleeve for axial movement thereon, a fixed means movable with one of said sleeves and interlocking said sleeves against relative rotation, an annular abutment means on each of said sleeves, and an adjustment means reacting between said abutment means for moving said flanges relative to one another.

2. A variable pitch sheave, comprising inner and outer flanges movable axially relative to one another, said inner flange having a sleeve secured thereto and extending laterally therefrom, said outer flange having a sleeve secured thereto and mounted on said first mentioned sleeve for axial movement thereon, a longitudinal slot in said first mentioned sleeve, a longitudinal slot in said second mentioned sleeve overlying said first mentioned slot, a key in said slots interlocking said sleeves against relative rotation, an annular abutment means on each of said sleeves, and an adjustment means reacting between said abutment means for moving one of said flanges relative to the other.

3. A variable pitch sheave comprising inner and outer flanges movable axially relative to one another, said inner flange having a sleeve secured thereto and extending laterally therefrom, an externally threaded annular member extending laterally from said inner flange in axial alignment with said sleeve and having a tapered inner surface, said outer flange having a sleeve secured thereto and mounted on said first mentioned sleeve for axial movement thereon, a longitudinal slot in said first mentioned sleeve, a longitudinal slot in said second mentioned sleeve overlying said first mentioned slot, a key in said slots, an annular bearing of non-metallic material interposed between said sleeves positioned at the two ends of said second mentioned sleeve and movable therewith, a split bushing seated in said annular member and engaging said tapered surface, a member threaded onto said annular member and connected to said split bushing for rotation relative thereto, an annular abutment means on each of said sleeves, and an adjustment means including a coil spring around said second mentioned sleeve reacting between said abutment means for moving said flanges relative to one another.

4. A variable pitch sheave, comprising inner and outer flanges movable axially relative to one another, said inner flange having a sleeve secured thereto and extending laterally therefrom, said outer flange having a sleeve secured thereto and mounted on said first mentioned sleeve for axial movement thereon, an annular bearing of non-metallic material interposed between said sleeves positioned at the two ends of said second mentioned sleeve and movable therewith, an abutment means on each of said sleeves, and an adjustment means reacting between said abutment means for moving said flanges relative to one another.

5. A variable pitch sheave, comprising inner and outer flanges movable axially relative to one another, said inner flange having a sleeve secured thereto and extending laterally therefrom, an externally threaded annular member extending laterally from said inner flange in axial alignment with said sleeve and having a tapered inner surface, said outer flange having a sleeve secured thereto and mounted on said first mentioned sleeve for axial movement thereon, a fixed means movable with one of said sleeves and interlocking said sleeves against relative rotation, an annular bearing of non-metallic material interposed between said sleeves positioned at the two ends of said second mentioned sleeve and movable therewith, a split bushing seated in said annular member and engaging said tapered surface, a member threaded onto said annular member and connected to said split bushing for rotation relative thereto, an abutment means on each of said sleeves, and an adjustment means including a coil spring around said second mentioned sleeve reacting between said abutment means for moving said flanges relative to one another.

6. A variable pitch sheave, comprising inner and outer flanges movable axially relative to one another, said inner flange having a sleeve secured thereto and extending laterally therefrom, an externally threaded annular member extending laterally from said inner flange in axial alignment with said sleeve and having a tapered inner surface, said outer flange having a sleeve secured thereto and mounted on said first mentioned sleeve for axial movement thereon, a fixed means movable with one of said sleeves and interlocking said sleeves against relative rotation, an annular bearing of non-metallic material interposed between said sleeves positioned at the two ends of said second mentioned sleeve and movable therewith, a split bushing seated in said annular member and engaging said tapered surface, a member threaded onto said annular member and connected to said split bushing for rotation relative thereto, an abutment means on each of said sleeves, and an adjustment means reacting between said abutment means for moving said flanges relative to one another.

7. In a variable pitch sheave: inner and outer flanges movable axially relative to one another, said inner flange having a sleeve secured thereto and extending laterally therefrom, an externally threaded annular member extending laterally from said inner flange in axial alignment with said sleeve and having a tapered inner surface, said outer flange having a sleeve secured thereto and mounted on said first mentioned sleeve for axial movement thereon, a split bushing seated in said annular member and engaging said tapered surface, and a member threaded onto said annular member and connected to said split bushing for rotation relative thereto.

8. In a variable pitch sheave: inner and outer flanges movable axially relative to one another, said inner flange having a sleeve secured thereto and extending laterally therefrom, said outer flange having a sleeve secured thereto and mounted on said first mentioned sleeve for axial movement thereon, a longitudinal slot in said first mentioned sleeve, a longitudinal slot in said second mentioned sleeve overlying said first mentioned slot, a key in said slots, and an annular bearing of non-metallic material interposed between said sleeves positioned at the two ends of said second mentioned sleeve and movable therewith.

References Cited by the Examiner
UNITED STATES PATENTS

| | | |
|---|---|---|
| 2,207,219 | 7/40 | Heyer. |
| 2,262,678 | 11/41 | Heyer. |
| 2,433,150 | 12/47 | Palm. |
| 2,721,484 | 10/55 | Otto. |
| 2,751,790 | 6/56 | Ingold. |
| 2,850,913 | 9/58 | Lewellen et al. |
| 2,976,739 | 3/61 | Lewellen et al. |

DON A. WAITE, *Primary Examiner.*

MILTON KAUFMAN, *Examiner.*